United States Patent [19]

Pierson et al.

[11] Patent Number: 4,478,266
[45] Date of Patent: Oct. 23, 1984

[54] COMPOSITE TREAD HAVING GOOD TRACTION AND REDUCED ROLLING RESISTANCE UPON WEAR

[75] Inventors: Robert M. Pierson, Hudson; Edward J. Haas, Stow; Edward C. Montgomery, Cuyahoga Falls, all of Ohio

[73] Assignee: The Goodyear Tire & Rubber Company, Akron, Ohio

[21] Appl. No.: 419,286

[22] Filed: Sep. 17, 1982

[51] Int. Cl.³ .................. B60C 11/00; B60C 1/00
[52] U.S. Cl. ................. 152/209 R; 152/330 R; 152/374
[58] Field of Search ............ 152/209 R, 330 R, 360, 152/374, 209 A, 209 B, 209 D, 209 NT, 209 WT

[56] References Cited

U.S. PATENT DOCUMENTS

| | | | |
|---|---|---|---|
| 2,445,725 | 7/1948 | Walker | 152/374 R |
| 3,157,218 | 11/1964 | Brown | 152/330 R |
| 3,830,275 | 8/1974 | Russell | 152/330 R |
| 4,381,810 | 5/1983 | Cady et al. | 152/374 |

FOREIGN PATENT DOCUMENTS 2000207 8/1969 France .................. 152/374

*Primary Examiner*—Lois E. Boland
*Attorney, Agent, or Firm*—H. C. Young, Jr.; D. J. Hudak

[57] ABSTRACT

A composite tread has at least a low hysteresis component and a high hysteresis component therein. The components are geometrically arranged such that upon wear, generally more of the high hysteresis compound is exposed as wear progresses which imparts good traction to the life of the tread.

10 Claims, 4 Drawing Figures

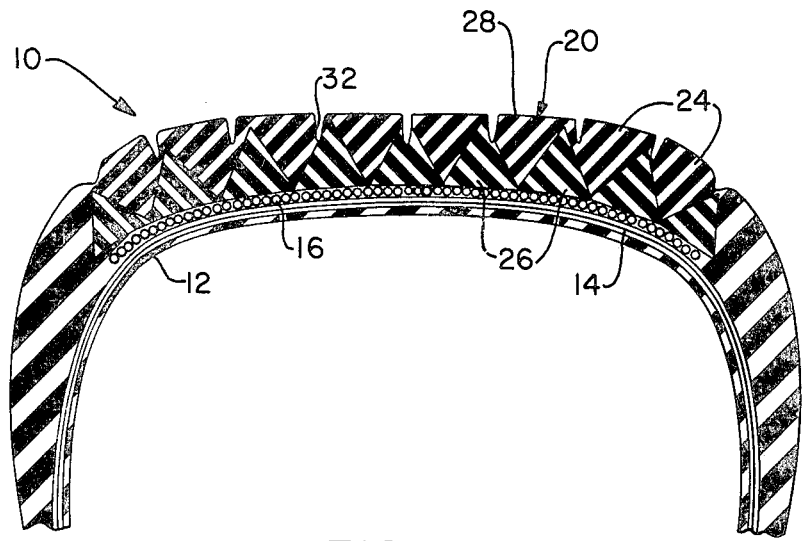
FIG.—1
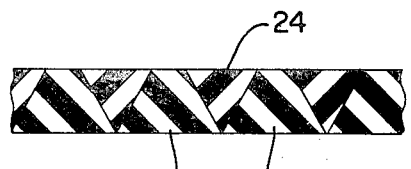
FIG.—2
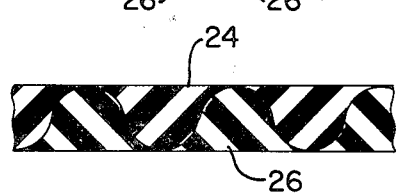
FIG.—3
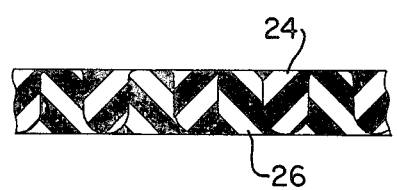
FIG.—4

COMPOSITE TREAD HAVING GOOD TRACTION AND REDUCED ROLLING RESISTANCE UPON WEAR

TECHNICAL FIELD

The present invention relates to a composite tread having good traction and low rolling resistance upon wear.

BACKGROUND ART

Heretofore, tires, such as for automobiles, have generally been of one type of compound throughout the tread area. Due to the existance of grooves and various tread designs, the tire generally has good initial traction. As a tire is worn, the rolling resistance is somewhat reduced since less grooves are available. However, reduction or loss of the grooves also inherently results in a loss of traction. Thus, often the tread compound of a tire is a compromise between low rolling resistance and high tread traction.

U.S. Pat. No. 3,157,218 relates to a pneumatic tire having an outer layer having a high degree of resistance to abrasion, groove cracking, and rib tearing. The inner layer is made of a relatively cool running rubber composition. This patent is not pertinent in that it teaches away from applicant's invention relating to a majority of an inner portion of the tread having a high hysteresis component.

DISCLOSURE OF INVENTION

It is therefore an aspect of the present invention to provide a composite tire tread containing at least two different rubber components therein.

It is yet another aspect of the present invention to provide a composite tire tread, as above, wherein a low hysteresis rubber component generally forms a majority amount of a radially outer portion of the tread and wherein a high hysteresis portion generally forms a majority amount of a radially inner portion of the tread.

It is yet a further aspect of the present invention to provide a composite tire tread, as above, wherein good traction is maintained as the tire tread wears.

It is yet a further aspect of the present invention to provide a composite tire tread, as above, wherein said inner tread component and said outer tread components can be of various configurations.

It is yet a further aspect of the present invention to provide a composite tire tread, as above, wherein said various tread components can be made by dual extrusion.

It is a further aspect of the present invention to provide a composite tire tread, as above, wherein said inner tread component generally contains high amounts of carbon black, oil, or high styrene copolymer, and the like.

These and other aspects of the present invention will become apparent from the detailed description set forth herein.

In general, a tread for a tire comprising: at least a high hysteresis component and at least a low hysteresis component, said low hysteresis component being predominant in the outermost tread surface.

In general, a tire having a tread thereon, the tread comprising: at least one low rolling resistant material and at least one frictional material, said materials forming separate domains in said tread and being contiguously contacted such that said low rolling material predominates in said outermost tread surface.

BRIEF DESCRIPTION OF DRAWINGS

For a better understanding of the aspects, techniques, and structure of the present invention, reference should be made to the following detailed description and accompanying drawings wherein:

FIG. 1 is a cross-sectional view of a tread portion of a tire showing the cords, belts, as well as a specific tread component configuration according to the present invention.

FIG. 2 is a cross-sectional view showing a different tread component configuration.

FIG. 3 is another cross-sectional view showing yet another tread component configuration.

FIG. 4 is a cross-sectional view showing still another tread component configuration.

BEST MODE FOR CARRYING OUT THE INVENTION

The present invention relates to a tire having a tread which has good initial low rolling resistance as well as good traction as the tread area is worn away. The tire tread has at least two components of two different compositions. One component generally relates to a material having low rolling resistance or a low hysteresis. Low hysteresis compounds have high resilience, and vice versa. This compound is generally located towards the radially outer portion of the tread and generally has a low rate of wear. Another component has high hysteresis which has the properties of good traction upon road surface, but a high rate of wear. This compound is generally located within the inward portion of the tread, that is, radially inward. Generally, the various components of the tread are located such that upon wear of the tread, more of the high hysteresis compound is exposed such that good traction with the road surface is maintained throughout the tire tread. Generally, any number of shapes or designs of the various tread components may be utilized.

Referring to FIG. 1, the road engaging portion of a tire is generally indicated by the numeral 10. That is, the sidewalls of the tire as well as the tire bead area have been deleted. Tire 10, except for the tread portion, can be any common or conventional tire. Thus, it has an inner liner area 12, along with tire cords 14. Positioned above the cords in FIG. 1 are tire belts 16 such as steel belts which reside only under the tread portion of the tire. The tread portion is generally indicated by the numeral 20. Within tread portion 20 of FIG. 1 exists two different types of rubber compounds, a low hysteresis compound generally indicated by the number 24 and a high hysteresis compound generally indicated by the number 26. Although only two different types of tread materials or compounds are shown, it is to be understood that the tread portion may have any number of separate and distinct tread materials such as from 2 to about 4 or 5 layers. However, the existence of two layers is preferred due to ease of manufacturing, quality control considerations, and the like.

Low hysteresis material 24 is a low rolling resistant and low wear tread compound such that engagement of the tire tread surface 28 with the road results in a low rolling resistance. Such a property is becoming increasingly important in the manufacture of modern day tires in view of the generally ever increasing costs of fuels required to power a vehicle, and the like, since low rolling resistant tires have been found to reduce gasoline and other fuel consumption by significant amounts.

As shown in FIG. 1, tread 20 has a plurality of grooves 32. As well known to the tire art, grooves are essential in providing traction to a tire, not only on dry surfaces, but also on wet surfaces. However, as a tire is worn, the groove depth is reduced and their effectiveness in providing a gripping surface or edge, that is traction, is also reduced. According to the present invention high hysteresis compounds or materials 26 are utilized generally predominating within the interior or inwardly of the tire tread, that is in the radially inward portion of the tire tread, so that as a tire wears, good traction is maintained with the road by the exposure of compound 26. As noted above, the general shape of traction material or high hysteresis material 26 is such that upon wear of the tire, gradually a larger amount or greater amount of high hysteresis material 26 engages the road surface, thereby providing good traction throughout wear of tread 20.

In order to generally maintain a constant road engaging surface property, for example low rolling resistance and yet good traction throughout the wear of tread area, inner layer 26 is generally of a design or shape such that more surface area is exposed as the tread wears. Thus, for example, high hysteresis material 26 can be triangular as shown in FIG. 1, a preferred shape. Other shapes include a truncated frustrum as shown in FIG. 2, also a preferred shape, a sinusoidal shape as shown in the cross-sectional view of FIG. 3, and the like. Still another shape is an inverted U shape as shown in FIG. 4, in which the tops of the U are flat or have been squared-off. Naturally, in a two component composite, the remaining or low hysteresis material has a shape to complete the tread area of the tire. The components generally exist as separate domains and are in contiguous contact with one another although there will be some minor "bleed in" of one component with another. It is to be understood that numerous other shapes exist, and that when three or more materials of different hysteresis or rolling resistance and traction properties are utilized, still more shapes can exist. The key is that the traction is generally maintained at a constant throughout the wear of the tire and in that generally more of the high hysteresis good traction material engages the road surface upon tread wear. Furthermore, due to the difference in wear rates, slight ridging occurs across the tread due to the high hysteresis compound wearing at a faster rate than the low hysteresis compound. Such ridging aids and increases the traction properties of the tread.

The low hysteresis or low rolling resistant material can be generally any tread or rubber compound having such properties. Typical elastomers include high cis elastomers made from dienes having from 4 to 12 carbon atoms, with from 4 to 8 carbon atoms preferred. Additionally, copolymers or interpolymers of such materials can also be utilized. By "high cis" it is meant polymers having a cis type microstructure of at least 75 percent, desirably above 90 percent and preferably above 95 percent of the repeating units. Examples of specific elastomers made from such dienes include polypiperylene, polyhexadiene, polyoctadiene, and the like. Polyisoprene, that is elastomers made from cis-1,4 isoprene, both natural and synthetic, and solution or emulsion polybutadiene are preferred.

With regard to the high hysteresis or good traction or frictional material, the compound can be various elastomers which have such properties or conventional elastomers which have high amounts of carbon black or oil. Typically, such elastomers include copolymers of dienes having from 4 to 12 carbon atoms, preferably from 4 to 8 carbon atoms with a vinyl substituted aromatic compound having from 8 to 12 carbon atoms. Examples of various specific diene compounds are given above. Examples of specific vinyl substituted aromatic monomers include styrene, 1-vinyl naphthalene, 2-vinyl naphthalene, alpha-methylstyrene, 3-methylstyrene vinyl toluene, 4-t-butylstyrene, and the like. In the copolymers produced therefrom, the vinyl substituted aromatic compound generally ranges from about 15 to about 50 weight percent and preferably from about 15 to about 35 weight percent of the copolymer. Moreover, the high hysteresis material can have a high oil loading, or a high carbon black loading, or both. Such high loadings in and of themselves can impart high hysteresis to an elastomer. A high oil loading generally ranges from about 40 to about 70 parts per 100 of rubber and preferably from 50 to 60 parts per 100 of rubber. The oils used can be any common or conventional oils known to the art and desirably are aromatic type oils. Generally, any type of carbon black can be utilized and desirably those having high surface areas. Such carbon blacks generally have the following ASTM designations: N-121, N-219, N-220, N-231, N-234, N-242, and the like. The amount of the carbon black loading generally ranges from about 70 to about 100 parts per 100 of rubber and preferably from about 80 to 90 parts.

The above amounts of oil, carbon black, or both therein, have been found to give high traction properties to the rubber. Traction properties can be measured by any number of tests, as for example, by tire skid resistance as set forth in the Federal Quality Grade Regulation, 49 CFR 575.104.

The rolling resistance is typically measured by a test described in the General Motors Engineering Publication, TPC (Tire Performance Criteria) Procedure and Specification; A-4082; Procedure #TWS, 1-80, March 1982.

By the term "hysteresis" is meant loss of energy. Thus, a high hysteresis rubber would have a high energy loss with a low hysteresis rubber having a low energy loss. Hysteresis of rubber compounds tend to be closely correlated to rebound and thus are often measured by rebound values. Moreover, it is well known to those skilled in the rubber art that rubber compounds with high rebound values have low rolling resistance, but sacrifice some traction, whereas low rebound values indicate rubber compounds with good traction and high rolling resistance. Thus, in the present invention, when high hysteresis tread compounds are utilized such as styrene-butadiene copolymers, they generally have a rebound value of about 50 to about 30 at room temperature. Desirably, the rebound is about 45 to about 30 and preferably from about 35 to about 45.

Low hysteresis compounds generally have a rebound value of from about 50 to about 80, and preferably from about 60 to about 70. Rebound is measured by ASTM Test D10 54-45.

The individual rubber layers or rubber materials can be made in any conventional or common manner as by blending the various ingredients together in the amounts desired as in a Banbury. In order to form the tread, the various designs can be extruded, cast, molded, or the like, with extrusion being preferred. Additionally, it is highly desired that the two or more various layers having different hysteresis properties be coextruded as through a dual extruder. Thus, the extruder can have a die having an appropriate design. Upon extruding, the composite layer can be directly attached to a suitable tire and the tire building operation carried out in a conventional manner with curing thereof such that the tread is fully cured to the tire carcass.

The present invention can be utilized on any object or article wherein an initial low rolling resistance is desired, while maintaining good traction properties as the article is worn. Accordingly, tires for various vehicles is a very suitable area, especially tires for passenger automobiles or light vans or trucks, wherein such physical properties are especially desired. Additionally, the composites of the present invention can be utilized in truck tires, or large off-the-road equipment tires such as bulldozers, earth movers, and the like.

The invention will be better understood by reference to the following examples.

EXAMPLES

High hysteresis and low hysteresis compounds were made according to the following formulation set forth in Table I. In Table I, conventional or commercial type rubbers, either oil or non-oil extended, were utilized.

will result in a tire having a generally constant low rolling resistance and good traction throughout.

While in accordance with the patent statutes, the best mode and preferred embodiments have been set forth, it will be apparent to those skilled in the art that various changes and modifications can be made without departing from the spirit or scope of the present invention. Accordingly, the invention is measured by the scope of the attached claims.

What is claimed is:

1. A tread for a tire, comprising: at least a high hysteresis component having an ASTM D10 54-45 rebound value of from about 30 to about 50 and at least a low hysteresis component having an ASTM D10 54-45 rebound value of from about 50 to about 80, said low hysteresis component being predominant in the radially outermost tread surface, said high hysteresis component being predominant in the radially inner portions of said tread, said high hysteresis component having a geometric configuration in said tread so that throughout wear of said tread from the radially outermost portion to the radially innermost portion of said tread, gradually more of said high hysteresis component is exposed throughout said tread.

2. A tread for a tire according to claim 1, wherein said

TABLE I

| COMPOUND | LOWER HYSTERESIS | HIGHER HYSTERESIS | LOWER HYSTERESIS | HIGHER HYSTERESIS |
|---|---|---|---|---|
| Rebound (ASTM D10 54-45) | 59-60 | 41-42 | 65.00 | low 40's |
| Styrene-butadiene rubber 23½ weight % styrene | 70.00 | 70.00 | — | 100.00 |
| Polybutadiene rubber (98% cis) | 30.00 | 30.00 | — | — |
| Oil-Aromatic | 32.00 | 50.00 | 7.00 | 50.00 |
| Natural Rubber (90% cis) | — | — | 100.00 | — |
| Black (carbon) | 65.00 | 90.00 | 45.00 | 90.00 |
| Stearic acid | 1.00 | 1.00 | 1.00 | 1.00 |
| N—phenyl-N'—isopropyl-P—phenylene diamine (antioxidant) | 3.00 | 3.00 | 3.00 | 3.00 |
| Sulfur | 1.75 | 1.75 | 2.00 | 1.75 |
| Sulfenamide (Accelerator) | 1.50 | 1.50 | 1.50 | 1.50 |
| Diphenyl guanidine (Accelerator) | .25 | .25 | — | .25 |
| Zinc Oxide | 3.00 | 3.00 | 3.00 | 3.00 |

The above compounds were prepared in a conventional manner. For example, all compounds except the sulfur and the accelerators were mixed in a Banbury for approximately 4-6 minutes at approximately 280°-330° F. After cooling, the sulfur and accelerators were added and blended for about two minutes at about 200° to 225° F. The rubber was then formed into an ASTM rebound block and rebound tests were made. As apparent from the table, the low hysteresis compound which either contain natural rubber or a blend of styrene-butadiene rubber with polybutadiene had a high rebound value of approximately 59-60. Such compounds are known to produce low rolling resistance as well as low wear. In contrast, the high hysteresis compound which contains either 100 parts of styrene-butadiene copolymer or a high amount of the styrene-butadiene rubber compound gave rebound values in the low 40's. Such rebound values result in good traction.

It is best seen from the above example that a tire produced according to the present invention having the high hysteresis component therein along with a low hysteresis component, with generally more of the high hysteresis component being exposed upon tread wear low hysteresis component comprises an elastomer made from monomers selected from the group consisting of dienes having from 4 to 12 carbon atoms, natural cis-1,4-polyisoprene, and combinations thereof,
wherein said high hysteresis component comprises a copolymer made from dienes having from 4 to 12 carbon atoms and vinyl substituted aromatics having from 8 to 12 carbon atoms in which the weight percent of said vinyl substituted aromatic ranges from about 15 to about 50 weight percent, and combinations thereof.

3. A tread for a tire according to claim 2, wherein said tread contains two component materials, wherein said high hysteresis component material has a rebound value of from about 45 to about 35, and wherein said low hysteresis material has a rebound of from about 60 to about 70.

4. A tread for a tire according to claim 1, 2 or 3, wherein said high hysteresis component has an oil loading range of from about 40 parts to about 70 parts per 100 parts by weight of said elastomer, or a carbon black loading of from about 70 parts to about 100 parts per 100 parts by weight of said elastomer, or both, and wherein said high hysteresis material has a truncated frustrum, sinusoidal or triangular shape.

5. A tread for a tire according to claim 4, wherein said low hysteresis material is selected from the group consisting of polybutadiene, natural or synthetic polyisoprene, and combinations thereof, said low hysteresis material having at least 90 percent of the repeating units of the cis configuration, and wherein said high hysteresis material is a styrene-butadiene copolymer having from 15 to 35 weight percent of styrene and wherein said oil loading is from about 50 to about 60 parts per 100 of elastomer, wherein said carbon black loading is from about 80 to about 90 parts per 100 of elastomer.

6. A tire having a tread thereon, the tread comprising:
at least one low rolling resistant material and at least one frictional material, said materials forming separate domains in said tread and being contiguously contacted with each other such that said low rolling resistant material predominates in the radial outermost tread surface, the amount of said frictional material gradually increasing throughout the radially inward direction of said tread from the radially outermost portion to the radially innermost portion of said tread, whereby gradually more of said frictional material is exposed throughout wear of said tread, and said frictional material having an ASTM D10 54-45 rebound number of from about 50 to about 30, and said low rolling resistant material having an ASTM D10 54-45 rebound number of from about 50 to about 80.

7. A tire having a tread thereon according to claim 6, wherein said low rolling resistant material comprises an elastomer made from monomers selected from the group consisting of dienes having from 4 to 12 carbon atoms, natural cis-1, 4-polyisoprene, and combinations thereof,
wherein said frictional material comprises a copolymer made from dienes having from 4 to 12 carbon atoms and vinyl substituted aromatics having from 8 to 12 carbon atoms in which the weight percent of said vinyl substituted aromatic ranges from about 15 to about 50 weight percent, and combinations thereof.

8. A tire having a tread thereon according to claim 7, wherein said tread contains two component materials, wherein said frictional material has a rebound of about 45 to about 30, and wherein said low rolling resistant material has a rebound of from about 60 to about 70.

9. A tire having a tread thereon according to claim 6, 7, or 8, wherein said frictional material has an oil loading range of from about 40 parts to about 70 parts per 100 parts of said elastomer, or a carbon black loading of from about 70 parts to about 100 parts of said elastomer, or both, and wherein said frictional material has a truncated frustrum, sinusoidal or triangular shape.

10. A tire having a tread thereon according to claim 9, wherein said low rolling resistant material is selected from the group consisting of polybutadiene, natural or synthetic polyisoprene, and combinations thereof, said low rolling resistant material having at least 90 percent of the repeating units of the cis configuration, and wherein said frictional material is a styrene-butadiene copolymer having from 15 to 35 mole percent of styrene and wherein said oil loading is from about 50 to about 60 parts per 100 parts of elastomer, and wherein said carbon black loading is from about 80 to about 90 parts per 100 of elastomer.

* * * * *